United States Patent [19]

Ueno et al.

[11] 4,374,548
[45] Feb. 22, 1983

[54] PLAYING VEHICLE WITH A PRIME MOVER

[75] Inventors: Eishin Ueno, Fuchu; Sho Kikuchi, Musashino, both of Japan

[73] Assignee: Takagi Manufacturing Co., Ltd., Toyama, Japan

[21] Appl. No.: 199,542

[22] Filed: Oct. 22, 1980

[30] Foreign Application Priority Data

Oct. 25, 1979 [JP] Japan ................................ 54-137971
Dec. 15, 1979 [JP] Japan ................................ 54-163171

[51] Int. Cl.³ ............................................... B62D 9/02
[52] U.S. Cl. ..................................... 180/79; 280/11.28
[58] Field of Search ................. 180/79, 180, 181, 11, 180/12; 280/87.04 A, 87.04 R, 11.28, 11.27

[56] References Cited

U.S. PATENT DOCUMENTS

| | | | |
|---|---|---|---|
| 252,970 | 1/1882 | Price et al. ...................... | 280/11.28 |
| 2,330,147 | 9/1978 | Rodriguez ...................... | 280/87.04 R |
| 3,331,612 | 7/1967 | Tietge ............................ | 280/11.28 |
| 3,437,161 | 4/1969 | Ufford ........................... | 180/181 |
| 4,069,881 | 1/1978 | Shiber ........................... | 180/181 |
| 4,073,356 | 2/1978 | Schlicht ......................... | 280/87.04 A |
| 4,094,372 | 6/1978 | Notter ........................... | 180/181 |
| 4,143,728 | 3/1979 | Shiber ........................... | 180/181 |
| 4,151,892 | 5/1979 | Francken ....................... | 280/87.04 A |

FOREIGN PATENT DOCUMENTS

111330 2/1876 France ............................ 280/11.28

*Primary Examiner*—John A. Pekar
*Attorney, Agent, or Firm*—Wenderoth, Lind & Ponack

[57] ABSTRACT

A playing vehicle is disclosed in which a human may ride on the vehicle body in a mode wherein he sits thereon while his legs are stretched and in which the body weight may be one-sided to either the left or right, thereby changing the travelling direction. The playing vehicle comprises bearings pivoted to the vehicle body by means of king pins, resilient members interposed between the vehicle body and the bearings, wheels supported on both bearings, and a prime mover placed on a mount. Both legs of a triangle whose base is a horizontal phantom line depicted longitudinally of the surface of the vehicle body is aligned with the inclining direction of the front and rear king pins.

9 Claims, 21 Drawing Figures

PLAYING VEHICLE WITH A PRIME MOVER

BACKGROUND AND SUMMARY OF THE INVENTION

This invention relates to a playing or sporting vehicle with a prime mover to be run by means of a driving force of a prime mover such as an engine. The vehicle is in the form of, for example, a skate-board, in which a human may ride on the board forming a vehicle body in a mode wherein he sits thereon while his legs are stretched and in which the body weight may be one-sided to either the left or right to thereby change the travelling direction. The invention provides a playing vehicle with which the driver can freely use the influence of inclination of weight, and can enjoy a feeling of speed obtained from travelling as if in a go-cart or a pocket bike moving along the ground with his eyes positioned at a low level, and the vehicle operates well moving straight ahead.

A playing vehicle in accordance with a first embodiment, which achieves the objects as noted above, comprises a vehicle body composed of a board of a size enabling a human to sit while his legs are stretched, the vehicle body being provided with wheels at the front and rear and at the left and right thereof, ideally wheels in the form of rollers. Bearings for supporting front and rear axles are pivoted to the body by means of king pins in a manner that they may be oscillated laterally of the body. Resilient members such as rubber or spring members are interposed between the body and the bearings. The prime mover is mounted on one of the front and rear bearings in stabilized fashion to transmit the driving force to the wheels on such bearing. The present invention is further featurized in that the above-described king pins are obliquely disposed so that a horizontal phantom line depicted in a longitudinal direction of the body forms the base of a triangle, and both legs of the triangle are in coincidence with inclined phantom lines along the king pins.

Next, a playing vehicle in accordance with a second embodiment is constructed such that a vehicle body is formed from a board of a size enabling a human to sit thereon while his legs are stretched. Wheels such as rollers are respectively provided at the front and rear and at the left and right of the body. A driving force of the prime mover is transmitted to the front wheels or to the rear wheels. Front and rear axles are supported with their left and right portions capable of oscillation up and down and oscillation also in a longitudinal direction, and the axles are forcibly oscillated in a longitudinal direction as the left and right portions of the body oscillate up and down. The playing vehicle in the second embodiment is further constructed such that the axles are prevented from being oscillated in a longitudinal direction as long as the body is maintained in a horizontal condition.

Other objects and advantages of the invention will be apparent from the following detailed description of preferred embodiments as applied illustratively to a playing vehicle, taken in conjunction with the accompanying drawings.

DESCRIPTION OF THE PREFERRED EMBODIMENTS

Figure 1:
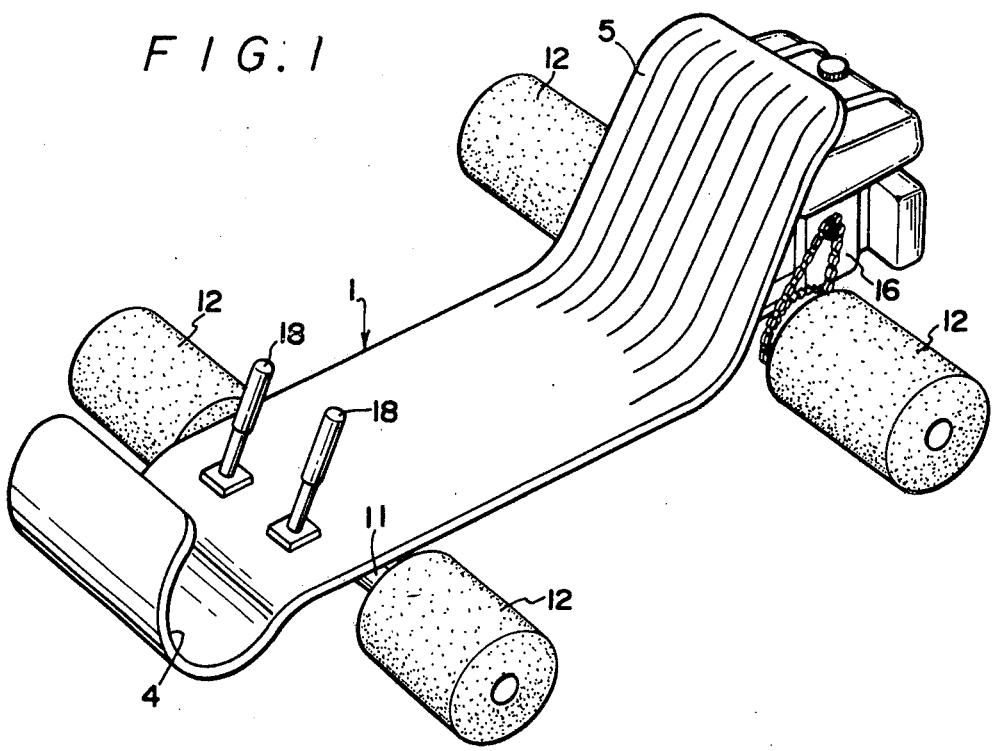
FIG. 1 is a perspective view showing a playing vehicle with a prime mover in accordance with the present invention.

A first embodiment of the present invention will now be described with reference to the accompanying drawings.

A vehicle body 1 has a chassis 2 in the form of a web-like elongated flat plate, with a rigid board 3 formed of a synthetic resin free from rust fastened integral with the chassis 2, a C-shaped upwardly curved foot housing portion 4 at the front end of the board 3, and a back rest plate 5 at the rear end. Also, front and rear portion of the chassis 2 have extending therefrom brackets 6 in a manner that the two brackets diverge downwardly. The lower portion of each of the brackets 6 is formed into an inverted U-shaped cross section.

A bearing 7 has its upper portion formed into a U-shaped section 8, and supporting members 9 for receiving a shaft depend from both sides of the U-shaped portion 8, wherein the U-shaped portion 8 is brought into engagement with the bracket 6 and may be pivoted oscillatably laterally of the body 1 by means of a single king pin 10. A single axle 11 is rotatably fitted through both supporting members 9, the axle 11 having wheels 12 in the form of rollers affixed to opposite ends thereof. A resilient member 13 formed of a synthetic rubber block is interposed between the bracket 6 and the bearing 7. The resilient member 13 may be replaced by a spring.

Figure 2:
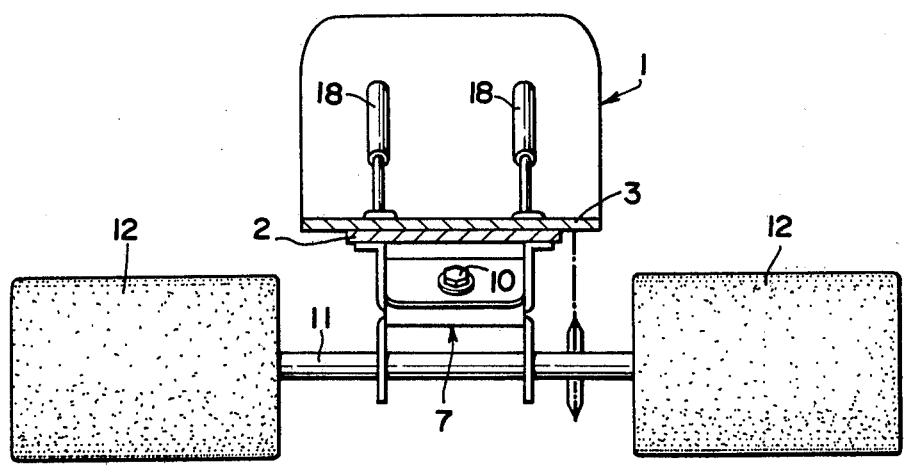
FIG. 2 is a front view showing the device of FIG. 2 with a front portion thereof shown in section.
Figure 3:
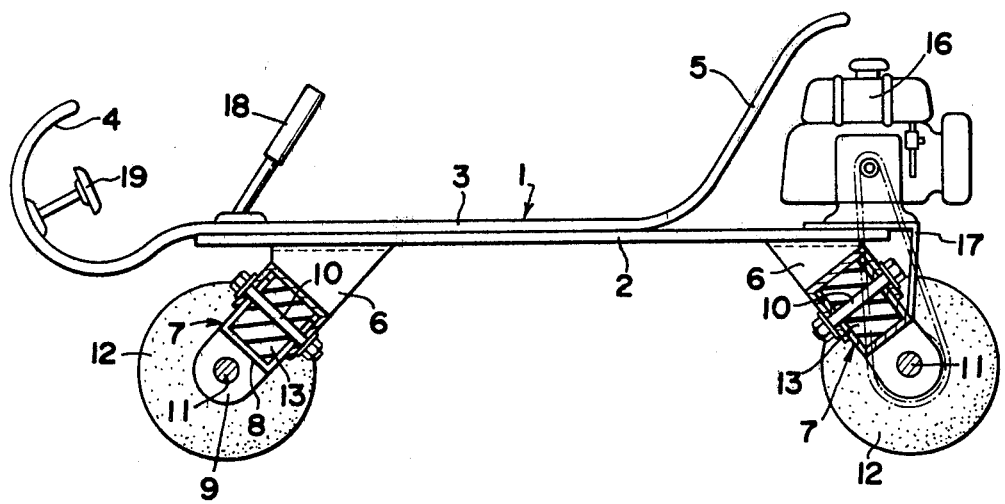
FIG. 3 is a side view showing a playing vehicle of one embodiment with bearing portions thereof shown in section.
Figure 4:
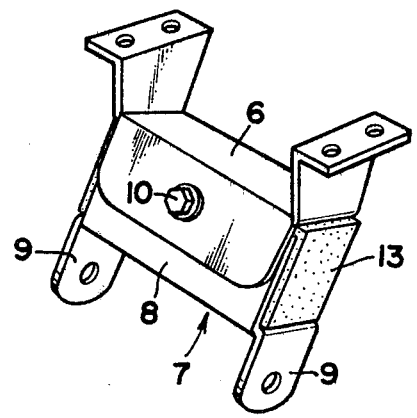
FIG. 4 is a perspective view showing a bearing portion.
Figure 5:
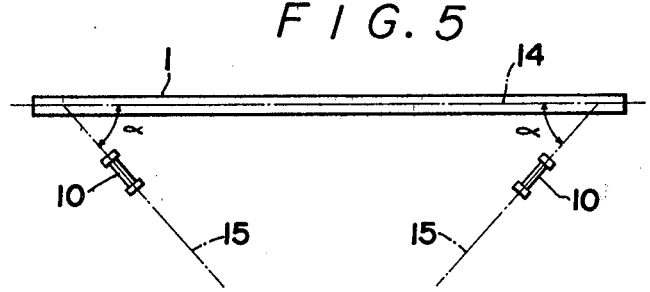
FIG. 5 is a side view showing the relation between phantom lines at which king pins are inclined and a horizontal phantom line depicted by the vehicle body.

The above-described king pin 10 is disposed in a state where it intersects perpendicularly to the extending direction of the bracket 6, and the relation between the king pins and the body 1 will be described. As shown in FIG. 5, a horizontal phantom line 14 depicted in a longitudinal direction of the surface of the body 1 is regarded as the base of a triangle, and both legs thereof are in coincidence with inclined phantom lines 15 along which the king pins 10 extend. While the intersecting angles α formed between the horizontal phantom line 14 and the inclined phantom lines 15 should preferably be made similar to each other at the front and rear portions, such angles are established within the range given by the formula of $0° < \alpha < 90°$. Conversely, if the king pins 10 are inclined so as to diverge downwardly with respect to the above-described horizontal phantom line 14, where a rider is one-sided in weight in an attempt to turn during travel, the body 1 is turned in a direction opposite to that of the one-sided weight. However, in this case, the vehicle is turned in a direction opposite to that of the application of the weight, and therefore, it involves an extreme danger during travel, making it impossible to substantially employ such arrangement. As is obvious from FIG. 2, both bracket 6 and bearing 7 are positioned in a central portion widthwise of the body 1, and the king pin 10 is provided in the center of the bearing 7.

Next, a prime mover 16, which is an electric motor or the like driven by a battery or a gasoline engine, is provided integral with the bearing 7 in a state where a mount 17 is disposed on the bearing 7 at the rear of the body 1 and extending from the chassis 2. The prime mover 16 is placed on the mount 17 and a driving force may be transmitted to the support shaft 11 of the rear bearing 7 by means of chains, belts or gears. A pair of handles 18 and 18 are extended from the front portion of the body 1 so that one handle 18 is used to effect accelerating operation of the prime mover 16 while the other is used to effect braking operation, or a pedal 19 disposed in the foot house portion 4 is used to effect braking operation.

Figure 8:
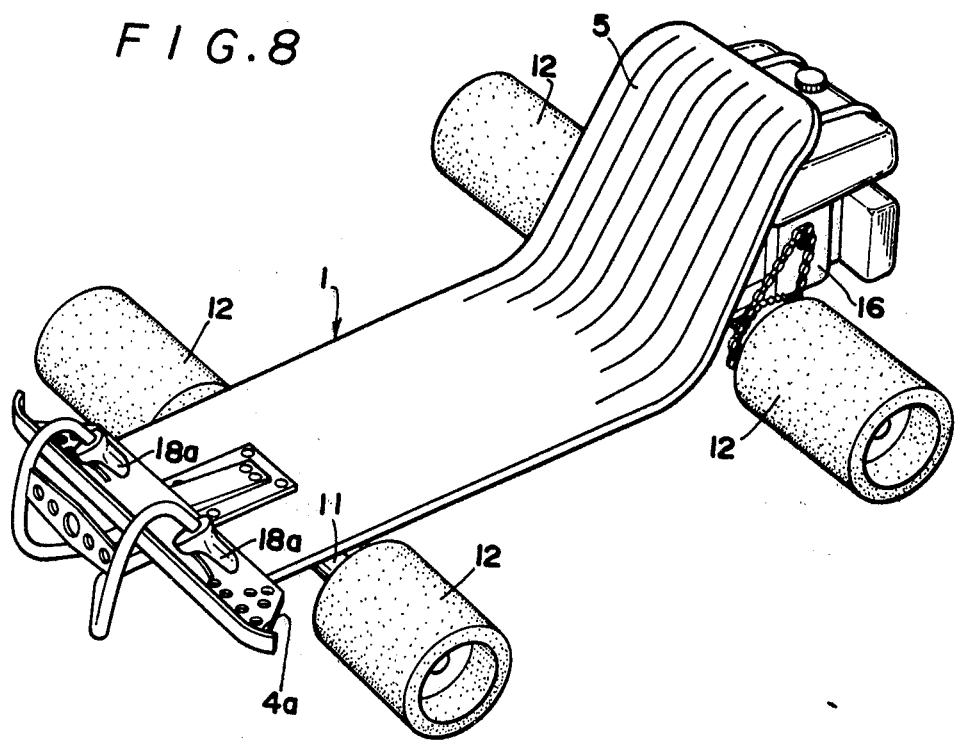
FIG. 8 is a perspective view of a playing vehicle showing another arrangement of a handle therefor.

Another arrangement of a handle is shown in FIG. 8. It will be noted that this arrangement also can be applied to the second embodiment described below.

Levers 18a extending from the front toward the rear of the body are provided in an upper space in the vicinity of a center line of the body directly before the seat, and grippers are provided at ends of the levers, the left-hand gripper having a brake lever of a vehicle attached thereto while the right-hand gripper an acceleration lever attached thereto. Frontwardly of the body is provided a step 4a on which an operator's feet are positioned.

In operation, when the operator is seated and his feet are engaged onto the step, the pair of levers naturally assume the position of the upper space between both legs of the operator. The operator grips the grippers of the levers to operate the acceleration lever and brake lever so as to control the travelling speed of the vehicle. The direction of the vehicle may be changed by the operation tilting his body towards the side to which it is intended to turn to move his weight and tilt the vehicle body, with the result that the steering wheel and steering and driving wheels may be automatically changed in direction.

It should be noted that both the handle and foot position may be displaced forwards or backwards as desired depending on the size of the operator's body.

In accordance with the present invention, since the levers are disposed in the upper space between the legs of the operator, his body may be moved smoothly during a mode of slalom travel and in addition, his body may be moved consciously to readily effect tilting of the vehicle body. Moreover, there is an effect in that no mental stress is involved.

Figure 6:
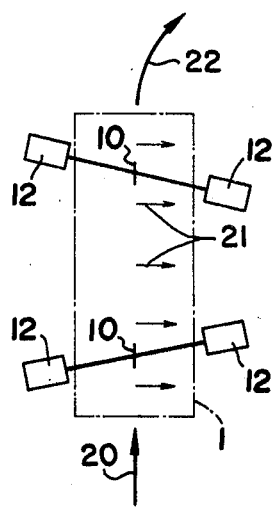
FIG. 6 is a plan view showing the state where the body is turned rightward.
Figure 7:
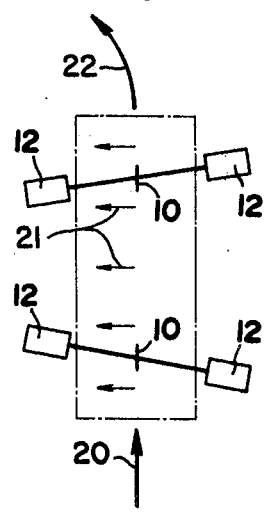
FIG. 7 is a plan view showing the state where the body is turned leftward.

With the construction as described above, in the first embodiment, if the rider sits on the vehicle body 1 in a normal position without being tilted, the vehicle may travel straight forward without turning laterally. However, when the rider is displaced with his weight towards either the left or right sides, the vehicle is turned, which states are shown in FIGS. 6 and 7 in each of which the arrow 20 designates the travelling direction, the arrows 21 the direction where toward which more weight is applied, and the arrow 22 the direction where toward which the vehicle is turned. When the rider's weight is one-sided to the right-hand side of the vehicle body during travel as shown in FIG. 6, the resilient members 13 interposed between the body 1 and the respective bearings 7 are compressed at the right side from the respective king pins 10 so that the body 1 tends to be tilted rightwards. However, since the king pins 10 are inclined with respect to the body 1, the front axle 11 is tilted from a position extending perpendicularly to or orthogonally to the body 1 to the position shown in FIG. 6 where the right side is retracted whereas the left side is advanced, while the rear axle 11 is tilted in a manner opposite to that of the front axle to cause the body 1 to be inclined rightwards, as consequence of which the body is turned to the right as shown by the arrow 22. Further, when the weight is applied to the left of the body 1, the vehicle is turned to the left as shown in FIG. 7. If the weight is balanced laterally with respect to the body 1 as done originally, the vehicle again runs straight forward.

Figure 9A:
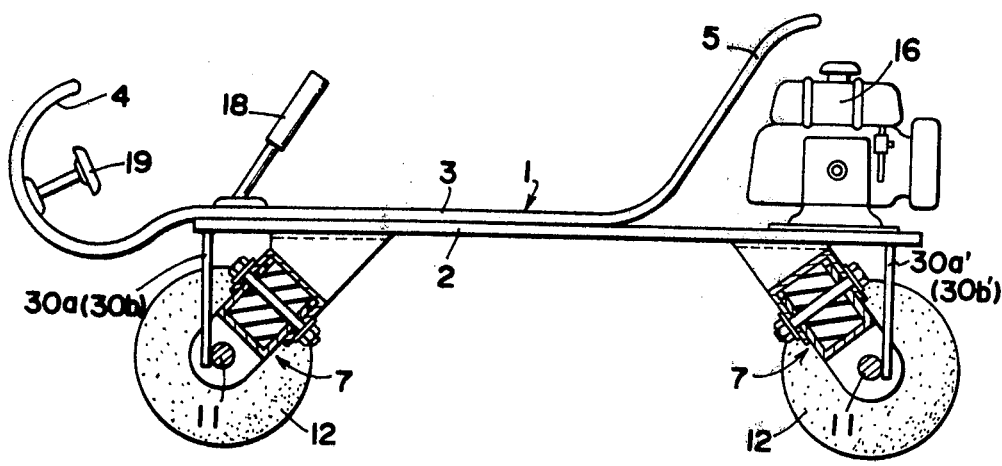
FIG. 9(a) is a sectional view of a playing vehicle showing an embodiment of a safety device.

An embodiment of a stabilizing device 30 is shown in FIG. 9(a), illustrating the operation of a straight travel stabilizing device. The device comprises two pairs of rods 30a, 30b, and 30a', 30b' which respectively are positioned at locations slightly forward of the front axle 11 and at locations slightly rearwardly of the rear axle 11, and which respectively depend from the chassis. During straight travel, the axles do not come into contact with the stabilizing devices 30, but when the axle is oscillated to the left or right due to roughness or the like of the travelling ground surface despite straight driving, either left or right portions of the axles impinge on the respective stabilizing rods to prevent oscillation of the axles.

Figure 9B:
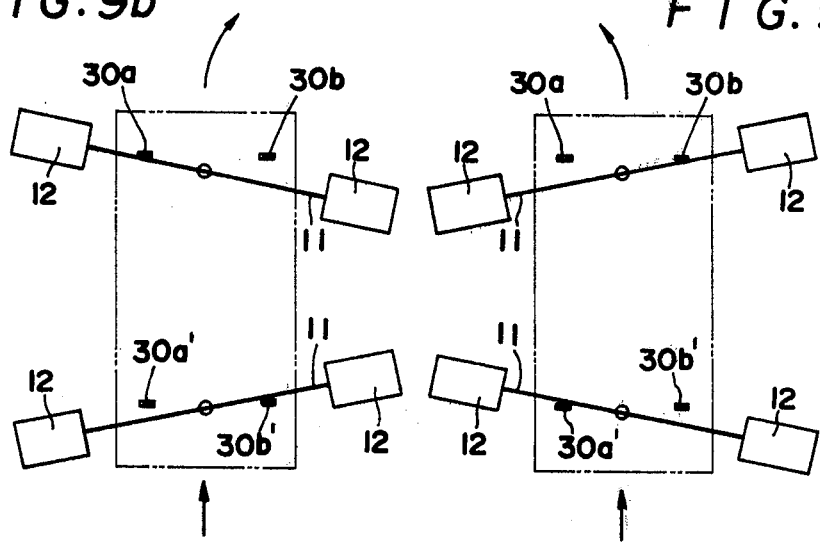
FIG. 9(b) is a plan view showing the state where the body is tilted rightward.

Next, when an attempt is made to turn to the left or right, for example when the vehicle is turned to the right, the center of gravity is tilted rightward, whereby the front axle tends to be rotated clockwise whereas the rear axle tends to be rotated counterclockwise as shown in FIG. 9(b). On the other hand, the body is tilted rightward, and as a result the lower end of the stabilizer 30a' on the left-hand side of the rear wheel is moved upwardly from the axle so that the stabilizing device assumes a disengaged state as shown in FIG. 9(c) enabling the axle to tilt therebeneath. Since the stabilizing rod 30b' on the right-hand side of the rear stabilizing device is initially provided rearwardly of the wheel, there involves no inconvenience in connection with rightward rotation. The front stabilizing device functions in a manner reverse to the rear stabilizing device. That is, the axle tends to be rotated clockwise and when the vehicle body is not tilted, the axle impinges upon the stabilizing rod 30a located forwardly and on the left-hand side. However, when the vehicle body is inclined rightwards, the left stabilizing rod 30a is disengaged from the axle and the axle is rotated clockwise depending on the inclination of the center of gravity. In this manner, the vehicle body can be turned rightwards.

Figure 9D:
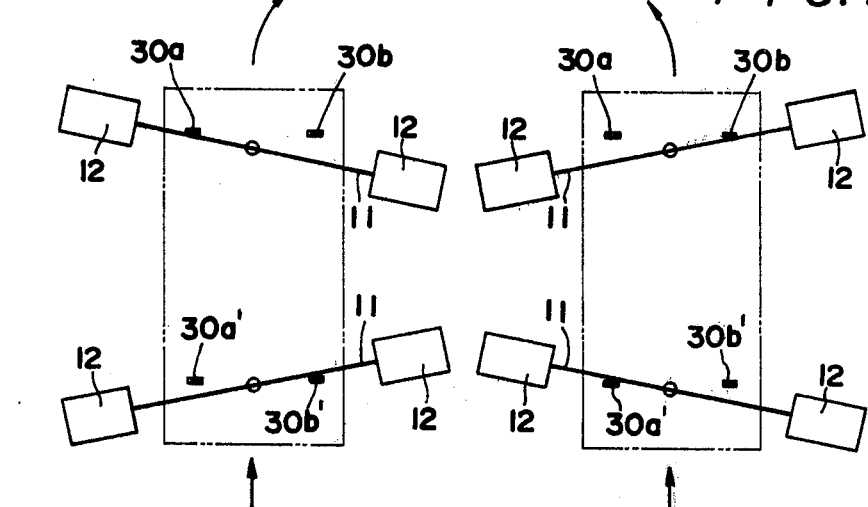
FIG. 9(d) is a plan view showing the state where the body is tilted rightward.
Figure 9C:
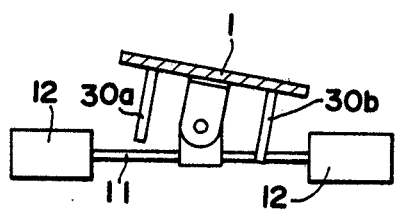
FIG. 9(c) is a rear sectional view showing the state of FIG. 9(b)
Figure 9E:
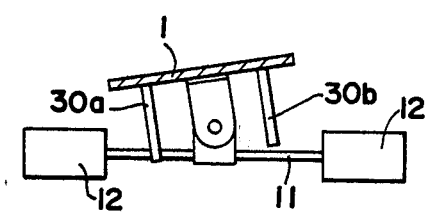
FIG. 9(e) is a rear sectional view showing the state of FIG. 9(d)

When the vehicle is turned to left, the operation will be made in a manner reverse to the manner of turning to the right, as shown in FIGS. 9(d) and 9(e).

Next, a second embodiment of the present invention will now be described with reference to FIGS. 10-17 of the accompanying drawings.

A vehicle body 1 has a chassis 2 in the form of a web-like elongated flat plate with a rigid board 3 formed of a synthetic resin free from rust fastened integral with the chassis 2, a C-shaped upwardly curved foot housing portion 4 at the front end of the board 3, a back rest plate 5 at the rear end, and axle supports 20 at front and rear of each vehicle body 1.

Figure 11:
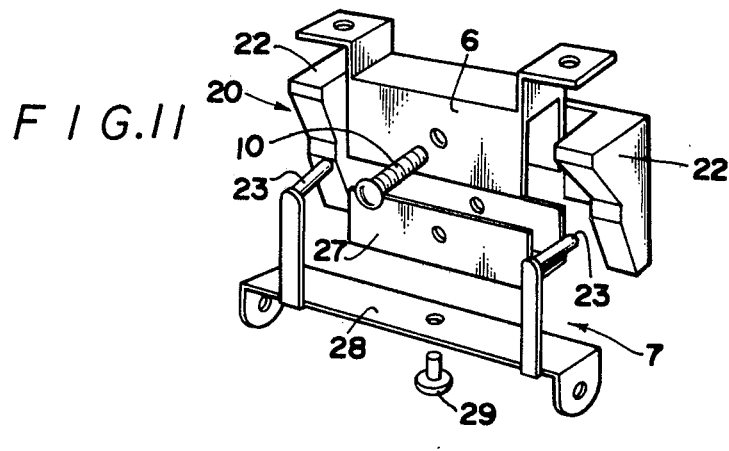
FIG. 11 is an exploded perspective view of an axle supporting portion.
Figure 12:
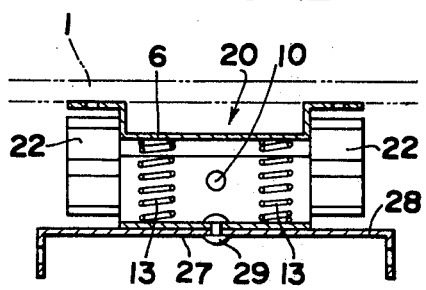
FIG. 12 is a sectional view of an axle supporting portion.

As shown in FIGS. 11 and 12, the axle support 20 has a bracket 6 with an inverted U-shaped section extended downwardly from the chassis 2 to as to depend perpendicularly, and a bearing 7 is pivoted by means of a king pin 10 extending parallel to the body 1 so that left and right portions of the bearing 7 may be oscillated up and down with respect to body 1. The bearing 7 comprises a head 27 with a U-shaped section that engages the bracket 6 and a leg 28 horizontally and rotatably pivoted by means of a pin 29 to the lower surface of the head 27. The head 27 is pivoted to the bracket 6 by means of the king pin 10 as previously described, and the leg 28 has an axle 11 supported thereon, the axle 11 having wheels 12 in the form of rollers fitted on opposite ends of the axle 11. A resilient member 13 such as a rubber block or spring is interposed between the head 27 and the bracket 6, the resilient member 13 being disposed evenly to the left and right of the king pin 10. The axle support 20 is provided with a motion conversion device 21.

Figure 10:
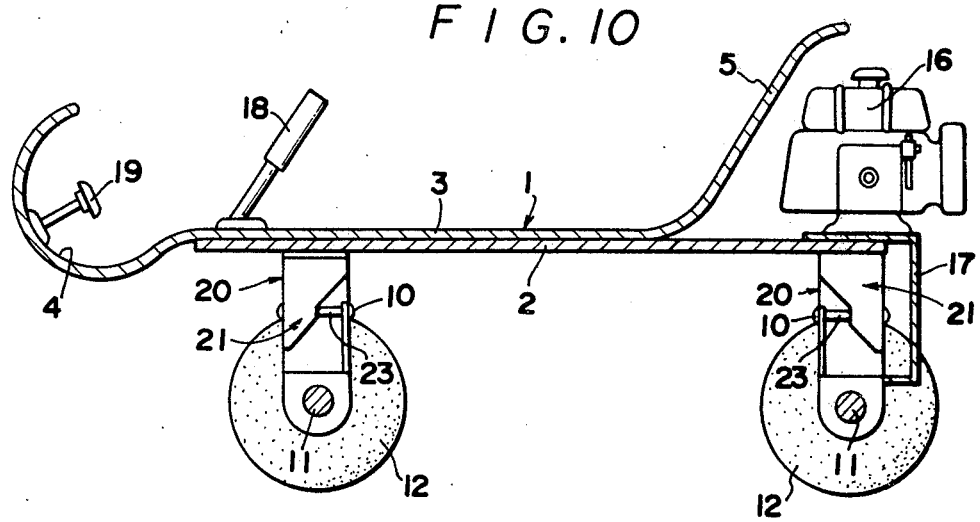
FIG. 10 is a sectional view of a playing vehicle in accordance with a second embodiment.
Figure 13:
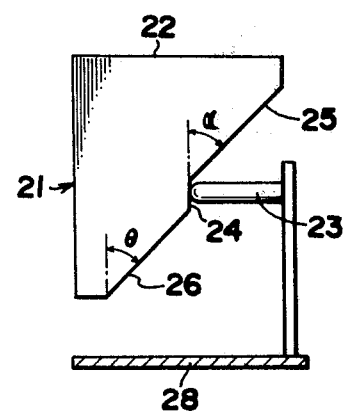
FIG. 13 is a side view in on an enlarged scale of one example of a motion conversion device.

The motion conversion device 21 comprises cam plates 22 and respective contact 23, the cam plates 22 being respectively extended from opposite sides of the bracket 6, the contacts 23 being provided on leg 28 of the bearing 7 so that the contacts come into contact with respective of the cam plates 22. Each cam plate 22 comprises substantially a right-angled triangle as shown in FIGS. 10 and 13, the cam plate being mounted with a surface as a leg thereof extending upright. The cam plate has a stabilized portion 24, which forms an upright surface, disposed intermediately of the leg, the stabilized portion 24 being formed at its upper and lower portions with inclined portions 25 and 26. Preferably, both angles of inclination $\alpha$ and $\theta$ of upper and lower inclined portions 25 and 26, respectively, are the same, e.g. 45°, and it is necessary that the lower angle of inclination $\theta$ not be smaller than the upper angle $\alpha$. The cam plates 22 positioned at front and rear of the vehicle body 1 are directed so that surfaces having such inclined portions 25 and 26 are opposed to each other.

A prime mover 16 is illustrated as a gasoline engine, and a mount 17 is extended from a leg 28 of the bearing 7 at the rear of the vehicle body 1, and the prime mover 16 is placed on the mount 17 to transmit a driving force to the axle 11 through a chain or the like. The prime mover 16 can be secured to the vehicle body 1, but in this case, the axle 11 is displaced and therefor the mechanism for transmitting the driving force becomes disadvantageously complicated. It is noted that as the prime mover 16, an electric motor with a battery can also be employed. The design is such that the prime mover 16 is operated by means of a handle 18 disposed at the front portion of the vehicle body 1 or by means of a pedal 25 disposed in the foot housing portion 4.

Figure 14:
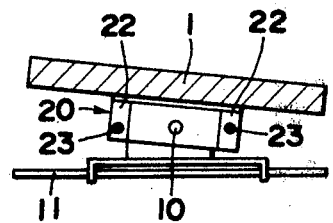
FIG. 14 is a sectional view showing the state where the body is tilted rightward.
Figures 15, 17:
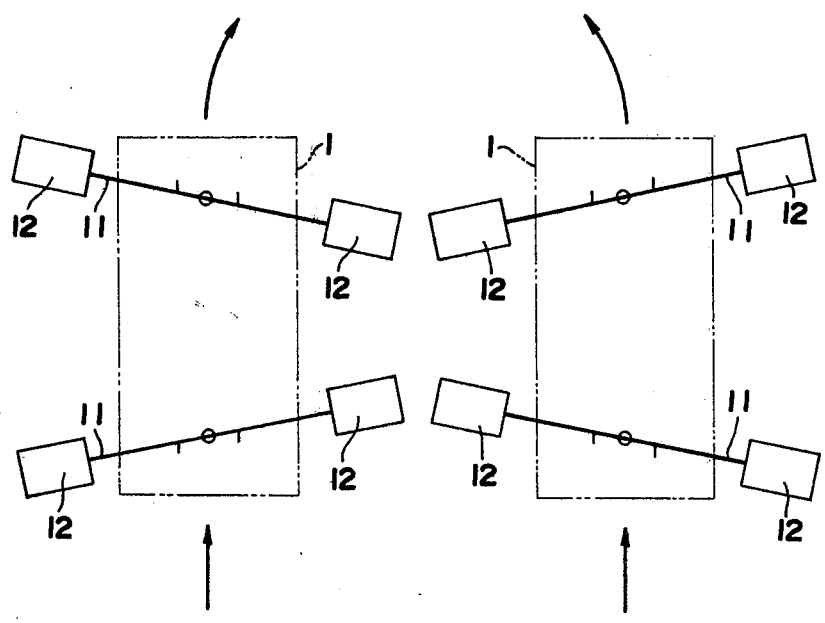
FIG. 15 is a plan view showing the state of FIG. 14.
FIG. 17 is a plan view showing the state of FIG. 16.

With the construction as described above, when the rider rides on the vehicle body 1 with the prime mover 16 operated to drive along a horizontal road surface, each of axles 11 is maintained in a position perpendicular or orthogonal to the vehicle body 1 since the front and rear, and left and right contacts 23 bear on the stabilized portions 24 of the respective cam plates 22. If the rider is tilted to the right of the vehicle body 1 to apply more force thereto, the vehicle body 1 is tilted rightward about the king pins 10, as shown in FIGS. 14 and 15, the right cam plates 22 at the 22 at front and rear portions of the body 1 moves downwardly, whereas the left cam plates 22 moves upwardly, and therefore, the contact 23 in contact with the cam plate 22 on the right side at the front portion is moved from the stabilized portion 24 to the upper inclined portion 25 into impingement thereupon and forced rearward by inclined portion 25, as a consequence of which the axle 11 of the front wheel is inclined to be moved about the pin 29, with the left side of front axle 11 moving frontwardly while the right side thereof moves rearwardly. On the other hand, since the contact 23 in contact with the cam plate 22 on the right side at the rear of the vehicle body 1 is also moved from the stabilized portion 24 to the upper inclined portion 25, the axle 11 of the rear wheel is moved about the pin 29 with the right side of rear axle 11 moving frontwardly whereas the left side thereof moves rearwardly. The condition then is that the axles 11 converge at the right side and diverge at the left side of the body. The result of such inclination is that the vehicle body 1 is turned to the right when additional driving force is applied. The more tilting of the vehicle body 1, the greater being the turning angle of the vehicle body 1.

Figure 16:
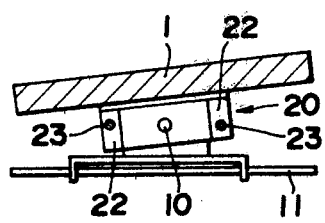
FIG. 16 is a sectional view showing the state where the body is tilted leftward.

Next, if the vehicle body 1 travels while being turned leftward, the body of the rider is tilted to the left, whereby the operation is effected in a manner opposite to that described above, so that the vehicle body 1 is turned leftward as shown in FIGS. 16 and 17. Further, if adjustment is made so that the rider's body is stabilized at the center of the vehicle body 1, the vehicle body 1 is turned to its horizontal position and the contacts 23 bears on the stabilized portions 24 of the cam plates 22 to assume a straight ahead posture.

As described above, in the playing vehicle with a prime mover of the present invention, steering is not effected by the operation of the handle but by one-sided displacement of weight, as previously explained in connection with the first embodiment, and the vehicle may be turned greatly or slightly depending on the degree of the one-sided displacement of weight. In addition, the vehicle may be turned in the same direction as that of the shift of weight, and therefore, it is possible to secure safety during travel. Moreover, since the prime mover is placed on a mount disposed on the bearing, the prime mover is inclined as the axle is inclined, and with this arrangement, the power may be directly transmitted from the prime mover to the axle, thus realizing transmission by the use of a simple construction.

As previously explained in connection with the second embodiment, the motion conversion device for converting up and down movement into longitudinal movement is provided on the axle support, such device being provided with a stabilized portion for prevention of longitudinal oscillation of the axle. With this arrangement, the possibility of zigzag movement of the vehicle body is avoided, while the vehicle body is maintained in a position for straight ahead travel, and if the road surface is horizontal, the vehicle may be run straight forward positively. Where the course of the vehicle body is changed, the rider may be one-sided in weight to either the left or right so that the vehicle is turned in the same direction as that of the side of the vehicle to which the weight is shifted, depending on the degree of inclination of the vehicle. Thus, it is possible to secure extremely safe travelling and to continue operation while enjoying the scenery.

Obviously many modifications and variations of the invention, as hereinafter set forth, may be made without departing from the spirit and scope thereof, and therefore, only such limitations should be imposed as are indicated in the appended claims.

What is claimed is:

1. A motorized sporting vehicle for transporting a person, said vehicle comprising:

a vehicle body extending in a longitudinal direction and constructed to support thereon a person;

front and rear axles, each said axle having on opposite ends thereof wheels;

front and rear axle support means for supporting said front and rear axles, respectively, on longitudinally spaced front and rear portions, respectively, of said body, such that right and left sides of said body, with respect to said longitudinal direction, are capable of up and down oscillation with respect to said axles upon lateral shifting of the weight of the person to the right and left of said body, respectively, and such that opposite ends of said axles are capable of oscillation in opposite directions longitudinally of said body;

prime mover means mounted for rotating one of said axles, and thereby for driving said vehicles;

motion conversion means associated with each said axle for, upon vertical movement of one side of said body with respect to said axle, imparting to opposite ends of said axle movement in opposite directions longitudinally of said body, whereby shifting of the weight of the person to one side of said body achieves longitudinal converging movement of those ends of said axles adjacent said side of said body, thus resulting in turning of said vehicle in the direction of said side; and each said motion conversion means including stabilizing means for preventing movement of said ends of the respective said axle longitudinally of said body in the absence of lateral vertical movement of said body with respect to said axle.

2. A vehicle as claimed in claim 1, wherein each said axle support means comprises a bracket fixed to and depending from said body, a bearing pivotally connected to said bracket by a king pin enabling said up and down oscillation, resilient means provided between said bracket and a first portion of said bearing for damping said oscillation, and a second portion of said bearing supporting the respective said axle and pivoted to said first portion by a pin to enable said longitudinal oscillation.

3. A vehicle as claimed in claim 2, wherein each said motion conversion means comprises cam plates fixed with respect to said body at locations adjacent opposite lateral sides of said bearing, each said cam plate having vertically inclined cam surfaces, and contacts supported at opposite lateral sides of said second portion of said bearing and in contact with a said cam surface of a respective said cam plate, such that vertical movement of said body with respect to said axle causes a respective said inclined cam surface to move in contact with the respective said contact, thereby causing the respective said second bearing portion and said axle to pivot about said pin.

4. A vehicle as claimed in claim 3, wherein each said stabilizing means comprises a vertically extending cam surface on each said cam plate, each side vertically extending cam surface being in contact with the respective said contact in the absence of lateral vertical movement of said body with respect to the respective said axle.

5. A vehicle as claimed in claim 4, wherein each said vertically extending cam surface joins respective said inclined cam surfaces above and below said vertically extending cam surface.

6. A vehicle as claimed in claim 2, wherein each said king pin extends in a direction parallel to said longitudinal direction of said body, and each said pin extends in a direction perpendicular to said longitudinal direction of said body.

7. A vehicle as claimed in claim 2, wherein said resilient means comprise coil springs.

8. A vehicle as claimed in claim 2, further comprising a mount supported by said bearing of said rear axle, said prime mover means being mounted on said mount for rotating said rear axle.

9. A vehicle as claimed in claim 1, wherein said body has at a forward portion thereof rest means for supporting the feet of the person and at a rearward portion thereof a seat, and further comprising left and right levers mounted adjacent a center forward position of said body at locations to be grasped by the hands of the person, each said lever having connected thereto and to said prime mover means gripper control means for controlling an operating condition of said vehicle.

* * * * *